(12) United States Patent
Jarolim

(10) Patent No.: US 12,006,627 B2
(45) Date of Patent: Jun. 11, 2024

(54) DEVICE AND METHOD FOR TREATING FIBRES

(71) Applicant: Michael Jarolim, Gaspoltshofen (AT)

(72) Inventor: Michael Jarolim, Gaspoltshofen (AT)

( * ) Notice: Subject to any disclaimer, the term of this patent is extended or adjusted under 35 U.S.C. 154(b) by 220 days.

(21) Appl. No.: 15/734,742

(22) PCT Filed: May 8, 2019

(86) PCT No.: PCT/EP2019/061775
§ 371 (c)(1),
(2) Date: Dec. 3, 2020

(87) PCT Pub. No.: WO2020/015883
PCT Pub. Date: Jan. 23, 2020

(65) Prior Publication Data
US 2021/0238802 A1    Aug. 5, 2021

(30) Foreign Application Priority Data

Jul. 18, 2018  (AT) .............................. A 50628/2018

(51) Int. Cl.
*D21D 1/30*  (2006.01)
*D21D 1/34*  (2006.01)

(52) U.S. Cl.
CPC ................. *D21D 1/30* (2013.01); *D21D 1/34* (2013.01)

(58) Field of Classification Search
USPC ....................................................... 162/261
See application file for complete search history.

(56) References Cited

U.S. PATENT DOCUMENTS

| 2,718,821 A | 9/1955 | Cumpston, Jr. |
| 3,586,250 A | 6/1971 | Shouvlin |
| 5,335,865 A | 8/1994 | Kohler et al. |

(Continued)

FOREIGN PATENT DOCUMENTS

| DE | 1943524 A1 | 10/1970 |
| EP | 0575803 A1 | 12/1993 |

(Continued)

OTHER PUBLICATIONS

International Search Report, issued in PCT/EP2019/061775 dated Jul. 18, 2019, 5 pages.

*Primary Examiner* — Jacob T Minskey
(74) *Attorney, Agent, or Firm* — Rothwell, Figg, Ernst & Manbeck, P.C.

(57) ABSTRACT

A device and method for treating fibres of a mixture of substances containing fibres, wherein the device comprises at least one outlet element for the passage of the mixture of substances containing fibres comprising an outlet opening and at least one first refining surface arranged around the outlet opening in a circumferential direction, as well as at least one feeding device for positioning the outlet element, and wherein a moveable handling body having a second refining surface is arranged opposite the at least one outlet element for handling the mixture of substances containing fibres, wherein, with the passage of the mixture of substances containing fibres through the outlet element, a gap-type handling area is formed between the first refining surface of the outlet element and a sub-surface of the second refining surface of the moveable handling body applied with the mixture of substances.

24 Claims, 7 Drawing Sheets

(56) References Cited

U.S. PATENT DOCUMENTS

Figure 1A:
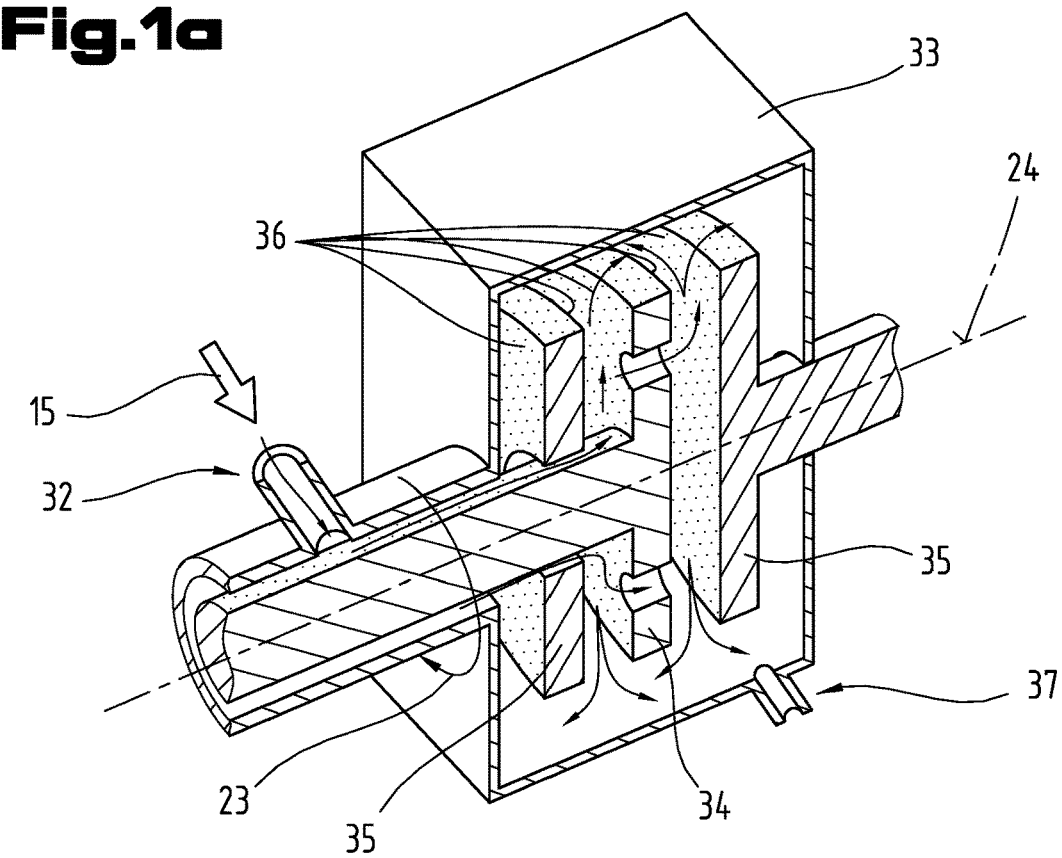

| | | | |
|---|---|---|---|
| 5,779,168 A | * | 7/1998 | Meltzer .................... D21D 1/30 |
| | | | 241/261.1 |
| 5,934,585 A | | 8/1999 | Chaney |
| 2006/0192040 A1 | | 8/2006 | Johansson |
| 2012/0006924 A1 | | 1/2012 | Ruola |
| 2012/0138250 A1 | | 6/2012 | Tamai et al. |
| 2017/0320063 A1 | | 11/2017 | Sjöström et al. |
| 2021/0238802 A1 | | 8/2021 | Jarolim |

FOREIGN PATENT DOCUMENTS

| | | |
|---|---|---|
| EP | 0731210 A2 | 9/1996 |
| EP | 0877117 A2 | 11/1998 |
| EP | 3824137 A1 | 5/2021 |
| JP | 2012-122156 A | 6/2012 |
| JP | 2012-520947 A | 9/2012 |
| JP | 2017-532464 A | 11/2017 |
| WO | 2020-015883 A1 | 1/2020 |

\* cited by examiner

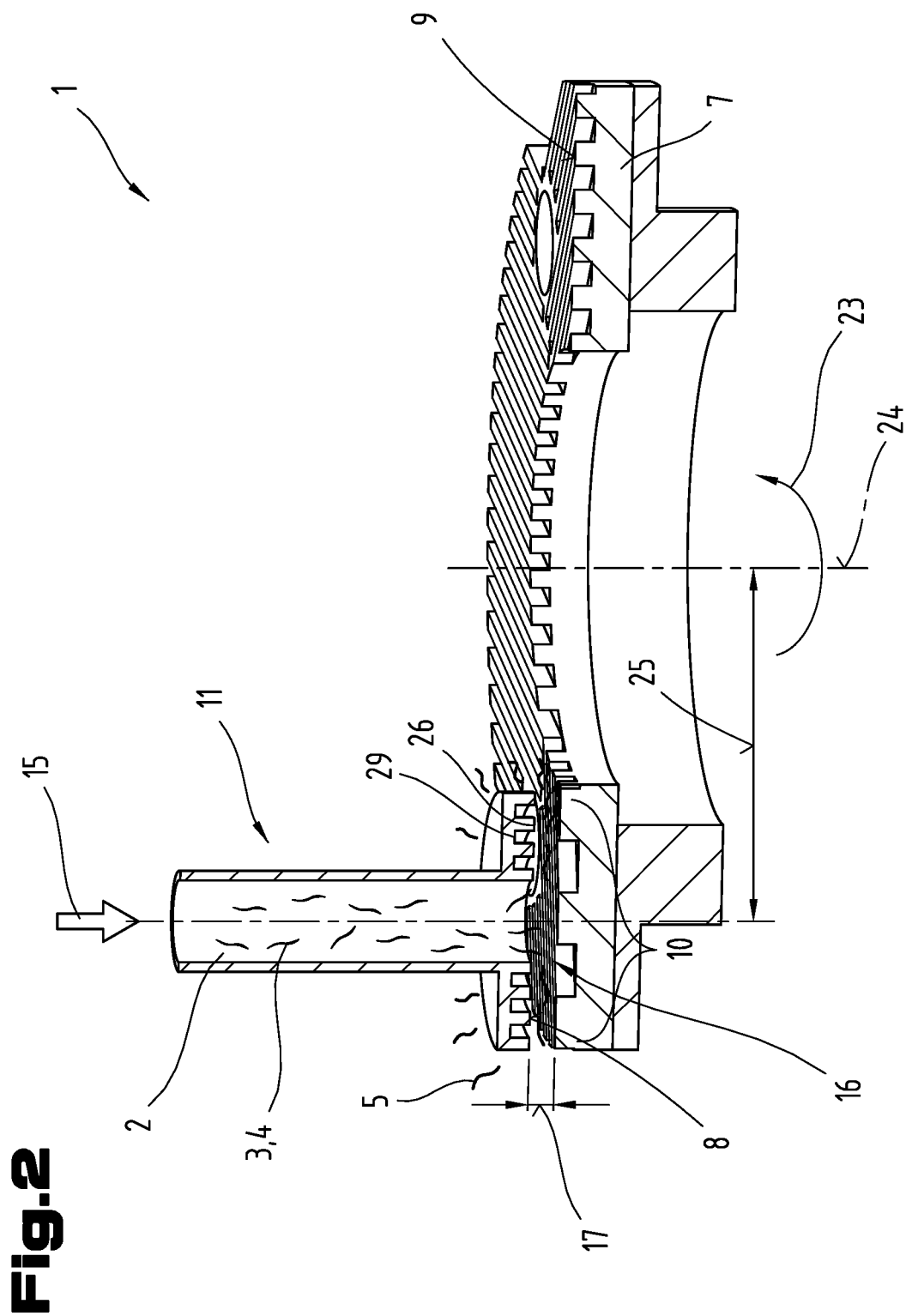

DEVICE AND METHOD FOR TREATING FIBRES

This application is a 35 U.S.C. 371 National Phase Entry Application from PCT/EP2019/061775, filed May 8, 2019, which claims priority to Austrian Patent Application No. A 50628/2018, filed Jul. 18, 2018, which are incorporated herein by reference in their entireties.

The invention relates to a device and a method for treating fibres, especially cellulose, of a mixture of substances containing fibres or cellulose, wherein only a sub-surface of a second refining surface of a movable treatment body is applied with the mixture of substances in relation to a first refining surface.

Fibres for the textile and especially paper industry must generally be treated or processed for the later use, so that the resulting product, such as paper, can have the desired properties in terms of strength, surface finish, printability and similar.

Most commonly, in the paper industry, one can find refining procedures that use refining units, especially refiners. The skilled persons are aware of a variety of possible arrangements of refining surfaces, between which the fibres of a mixture of substances or substances are treated. The refining surfaces are usually equipped with individual teeth, bars, rows of teeth or similar, between which grooves, notches or similar are provided. Such refining surfaces with blades or even the refining tools are often referred to as (refining) sets.

Usually, during the treatment, the mixture of substances is pressed between the refining surfaces and processed in a processing or treatment zone. Depending on the arrangement of the refining tools or refining surfaces, the processing zone is provided between a unilaterally rotating refining surface (e.g. rotor-stator arrangement of a single disc refiner) or between refining surfaces rotating against each other (e.g. double disc refiner). Even other refiners, such as drum or conical refiners, work according to this principle. In similar processes, such as dispersion, a mixture of substances containing fibres is applied on refining, processing or treatment surfaces.

The treatment or processing of the fibres takes place through pressure pulses between the extensions, such as blades, edges, etc. of the respective refining surfaces. Whether the fibres are cut more (crisp refining) or fibrillated more (greasy refining) during the processing, depends on some parameters known to the skilled person. As parameters, besides the geometry of the refining tools, the setting of the refining gap or of the treatment zone, the specific edge load as defined by Brecht-Siewert, the substance density used, even other factors can have an influence on the refining intensity of the mixture of substances used and the processed fibres, respectively.

In order to ensure economical refining or dispersion with a high throughput of the mixture of substances, only such arrangements are so far known, in which the refining surfaces and partly even adjacent secondary surfaces are in direct contact with the mixture of substances. This means, using the example of a double disc refiner, as disclosed e.g. in DE10066175B4, or even a drum refiner, as disclosed e.g. in EP2659061B1, that a very high amount of energy must be expended for moving the rotating refining surfaces. In addition, most of the known arrangements require a pressure housing in order to ensure the supply of the mixture of substances to be processed into the treatment zone. In other words, it is necessary to apply the mixture of substances to the entire moving refining surface of both refining tools used in the treatment process. In most cases, the mixture of substances is also applied onto other moving parts, such as shafts; as a result, a part of the amount of energy used cannot be used for the actual treatment of the fibres. Moreover, known arrangements must often be equipped with complex sealing solutions in order to ensure a controllable supply and/or removal of the mixture of substances. Furthermore, known devices often have a very complicated design and cause relatively high costs for maintenance and service work, since the sets or refining tools used wear and always require a standstill for maintenance work.

Other refiner designs are also known to the skilled person under the term "Hollander refiners", wherein a non-pressurised drum-shaped refining surface is immersed in a suspension containing fibres. A continuous operation is however not possible, as a result of which the throughput of the processed mixture of substances remains very low.

The object of this invention is to overcome the disadvantages of the state of the art and to provide a device and a method, using which a user is able to carry out a simple, cost-effective, reliable and particularly energy-efficient treatment or processing of a mixture of substances containing fibres. Another object of the invention is to keep the total energy expenditure and especially the idle power during the operation of the device as low as possible. This invention must furthermore provide a device and a method, which is suitable for treating different substance densities with only slight adjustments and, among other things, shortens or cheapens the maintenance work significantly.

This object is achieved by a device and a method according to the claims.

The device according to the invention, especially a refiner, for treating fibres of a mixture of substances containing fibres, comprises at least one outlet element for the passage of the mixture of substances containing fibres having an outlet opening and at least one first refining surface arranged around the outlet opening in a circumferential direction, and at least one feeding device for positioning the outlet element. In order to treate the mixture of substances containing fibres, a movable treatment body having a second refining surface is arranged opposite the at least one outlet element, wherein, with the passage of the mixture of substances containing fibres through the outlet element, a gap-type treatment zone is formed between the first refining surface of the outlet element and a sub-surface of the second refining surface of the movable treatment body, applied with the mixture of substances.

In the method according to the invention, at least the following process steps performed:

provision of a mixture of substances, which comprises at least one liquid component, preferably water, and fibres, preferably cellulose;

moving of a movable treatment body relative to the at least one outlet element with a pre-definable relative speed;

pressing of the mixture of substances containing fibres through the at least one outlet element with a pre-definable process pressure;

treating of the mixture of substances by forming a gap-type treatment zone for the treatment of fibres between a first refining surface of the at least one outlet element and a sub-surface of a second refining surface of the movable treatment body, applied with the mixture of substances, by positioning the outlet element relative to the movable treatment body;

Due to the relative movement of the second refining surface of the treatment body relative to the outlet element or the first refining surface, the fibres of the mixture of substances are treated or processed in the gap-type treatment zone. In the context of this invention, treatment is understood as the fibrillation and/or shortening and/or increase of the binding capacity of fibres and/or dispersion, up to the generation of nano-fibres. The refining intensity can be adjusted in this way. Thereby, the intensity of the fibre treatment can be set relatively easily through the working distance or refining gap and/or the relative speed of the effective refining surfaces or refining sets with respect to one another and/or the design of the refining sets.

A significant advantage lies in the energy-efficient arrangement of the partly known components, especially in the application of only a sub-surface of the second refining surface, which is arranged on the movable treatment body. A significant reduction of the idle power can be achieved through application of, in comparison with known arrangements, relatively small parts of the second refining surface or the moving refining tool. Thus, the total energy expenditure for the operation, particularly drive of the treatment body, of the device can be significantly reduced as compared to a refining surface "fully" applied with a mixture of substances. For further explanation, reference is made to the exemplary, schematic representations of FIG. 1a in comparison with the embodiments according to the invention and their discussion.

Moreover, a very gentle treatment of the fibres is possible due to the fact that high rotational speeds of the movable treatment body or relative speeds between the first and second refining surface can be adjusted, as a result of which the refining energy brought in is relatively high in comparison with the total energy expenditure.

The device according to the invention is suitable for treating a variety of organic and/or synthetic fibres, but preferably pulp or cellulose. The mixture of substances can be supplied via at least one supply device for providing the mixture of substances containing fibres at the outlet element with a pre-definable process pressure. The pre-definable process pressure generates a continuous flow of the mixture of substances in the treatment zone and can be used for variation of a change in speed of the mixture of substances in the treatment zone.

The presented device also allows removing long and/or not sufficiently chopped or processed fibres and/or other interfering material from the treatment zone through the relative movement of the treatment body and preventing clogging of the device. Thus, a relatively high quantity of mixture of substances can be processed and the homogeneity of the processed mixture of substances can also be increased. The process safety is also increased.

Furthermore, the refining surfaces used can be adjusted relatively easily to the requirements of the mixture of substances to be processed, as a result of which a function as a disperser or as a refiner can be realised with the same operating principle by means of the device or method according to the invention. It is therefore possible to process very different substance densities from 0.1 to 35 vol. % and partly, also up to 50 vol. %, while substance densities of 2 to 35 vol. % are customary in case of conventional dispersers or refiners. One of the reasons for this is that the removal of the mixture of substances in the treatment zone is not so strongly dependent on the groove geometry of the two corresponding refining surfaces, but is substantially supported by the relative movement of the second refining surface in relation to the first refining surface. The design of the supply device as a conventional fluid pump may not be sufficient under certain circumstances for very high substance densities and alternatively, for example, a screw conveyor or similar may be beneficial.

The first and/or second, or further, refining surface(s) can have teeth, blades, or similarly functioning extensions, which, if the device according to the invention is designed as a disperser, mesh with one another during the operation; while, if the device is designed as a refiner, they are moved past one another preferably as rows of blades.

Moreover, the device according to the invention can be manufactured and operated in a relatively easy and cost-effective manner, since complicated components are omitted. Any wearing parts are relatively easily accessible and affordable to replace, due to which the operating times can be increased significantly. In addition, the at least one outlet element can, under certain circumstances, be changed or replaced possibly even during the operation of the device.

Since the processed mixture of substances is very highly accelerated when it exits the treatment zone, it can be easily collected in a housing surrounding at least parts of the treatment body and/or the outlet element. A considerable part of the treatment body is thus not in direct contact with the mixture of substances. The treatment body can therefore be moved with low resistance, as a result of which the total power consumption can be significantly reduced by the amount of the saved idle power. This further implies that no pressure housing has to be used for the supply/removal of the mixture of substances, but a simple housing for collecting the substance is sufficient.

Moreover, it can be expedient if the movable treatment body is designed such that it can be driven in a direction of movement in essence laterally, preferably orthogonally, towards an outlet element axis of the outlet element by means of a drive device.

This corresponds to an "active" and thus regulatable movement of the movable treatment body in the direction of movement. The outlet element axis essentially corresponds to an imaginary longitudinal axis through the outlet element at the centre of the outlet opening. The movement takes place in essence laterally, preferably orthogonally, towards the outlet element axis of the outlet element and can be initiated and regulated by means of the drive device. In this way, the relative speed and thus the amount of the refining intensity in the treatment zone can be adjusted relatively easily.

As explained above, the so-called edge load in the refining surfaces, i.e. the refining tools or refining sets, and thus the degree of shortening of the fibres during the refining can be effectively influenced by means of the rotational speed of the treatment body or the relative speed of the second refining surface. The specific edge load according to Brecht-Siewert represents a well-known measurement for the refining intensity. The specific edge load is thus to be understood as an intensity parameter that indicates the amount of energy introduced into the mixture of substances over a certain blade/edge/groove length. The refining intensity results from the quotient of pure refining power and the edge length per second in J/m. The pure refining power corresponds to the difference between the total refining power and the pump power or idle power.

The higher the edge load, the stronger the fibres are shortened; while a lower edge load has an intensified fibrillating effect. The edge load can be reduced by increasing the rotational speed and it can be increased by reducing the rotational speed. Thus, according to the invention, a pre-definable quality of the processed fibres can be set in a relatively easy manner. Accordingly, any type of motor, such as electric or hydraulic motors, can be used as drive device.

Provision can also be made for the movable treatment body to be designed as rotationally symmetrical, e.g. as a disc, cylinder, cone, or in the form of a band, e.g. a chain or band.

The geometry of the treatment body can be selected by the skilled person in view of the available space, feeding rates, drive power and similar. In certain cases, band-shaped treatment bodies can therefore be advantageous, which are also only partly applied with the mixture of substances. The rotationally symmetrical treatment bodies also allow a relatively simple design according to the task and can be designed to be dimensionally very stable without having to accept excessive energy expenditure for the movement; because, in each case, only a sub-surface applied with the substances is sprayed with the mixture of substances.

It is also particularly beneficial that the movable treatment body is designed to be rotatable as a disc laterally, preferably orthogonally, towards the outlet element.

When embodied as a disc or plate, the advantages of inexpensive procurement, long service life and low maintenance costs can be used particularly well. Moreover, such discs can have suitable receptacles for separately arranged refining surfaces, as a result of which only the worn refining surface must be replaced if necessary.

Furthermore, it can be provided that the at least one feeding device is designed to be movable parallel to an axis of rotation of the disc, for setting a pre-definable radial distance of the outlet element axis from the axis of rotation.

This embodiment allows an independent or even additional possibility for controlling the relative speed in the treatment zone, which can be adjusted relatively easily using the different circumferential speeds depending on the radial distance from the axis of rotation. This measure can be provided in addition to or even instead of a rotational speed control of the drive device and offers another effective method for adjusting the refining intensity.

According to a further development, it is possible for at least the first refining surface to have at least one, preferably more than two, rows of blades.

For the execution of this invention, at least one first refining surface "armoured with blades" or edges is required. Under certain circumstances, the second refining surface can have only a multitude of teeth in order to apply the pressure surges onto the fibres of the mixture of substances during the treatment or processing. However, it has been found that a particularly good treatment, especially refining, can be achieved if both refining surfaces have a number of rows of blades, as is preferably the case in a device designed as a refiner.

Furthermore, it can be expedient if the at least one row of blades of the first refining surface has a closed refining edge.

By means of the closed refining edges, treating of the fibres can be improved to the effect that, in this way, the untreated outlet of the mixture of substances through any notches, channels or grooves can be controlled better or even completely avoided. This forcing of pressure shocks and/or refining edge contacts can contribute significantly to increasing the refining efficiency, i.e. to increasing the probability of the fibres being treated. By means of this measure, the process stability and quality of the processed fibres can also be increased.

Moreover, provision can be made for the first refining surface to have a longitudinal extension, which is larger in the direction of movement than in a transverse direction and/or against the direction of movement.

By optimising the shape of the first refining surface, homogenisation of the outlet of the mixture of substances along the circumference of the first refining surface can be achieved. The homogeneity and/or quality of the processed mixture of substances can also be improved in this way, since the refining intensity can be improved, or rather essentially become the same, over the effective first refining surface in all directions.

Furthermore, the at least one, preferably more than two, row(s) of blades of the first refining surface can be arranged concentrically in relation to the outlet opening.

Due to this measure, an uncontrolled outlet of the mixture of substances through notches, grooves or channels can be efficiently reduced, or even avoided. The rows of blades can preferably have a closed edge line, as a result of which this effect can be increased further. This forcing of pressure shocks and/or refining edge contacts can contribute significantly to increasing the refining efficiency.

According to a particular form, it is possible for the first refining surface to be designed as being substantially complementary in shape to the sub-surface of the second refining surface of the movable treatment body, which is applied with the mixture of substances.

In particular, in case of curved inner or outer surfaces of the treatment body, e.g. in case of a cylinder or a cone, this measure can increase the homogeneity of the outlet of the mixture of substances from the treatment zone, which is formed for the uneven sub-surface, to which the mixture of substances is applied. This can decisively contribute to homogenising the local outlet speeds and/or the refining intensity on the fibres to be processed in the treatment zone via the first refining surface, which contributes to increasing the quality.

According to an advantageous further development, it can be provided that an end section of at least one outlet element is designed to be rotatable, preferably drivable, at least partly around the outlet element axis.

With the help of a rotatable outlet element, for example by means of a suitable design of the first refining surface, a "passive" rotation of the first refining surface can be effected during the passage of the mixture of substances. The formation of a separately drivable, i.e. rotatable, end section is however considered to be advantageous. In both cases, the wear of the first refining surface, which develops primarily in the direction of movement of the movable treatment body, can be compensated step-by-step or even continuously with an "active" pre-definable rotation. As a result, uniform wear of the first refining surface can be achieved, thanks to which the service life or operating life can be increased. This can also be used to improve a continuously uniform quality of the processed mixture of substances.

In particular, it can be advantageous if the at least one feeding device is designed such that it can be aligned in order to set a working distance between the first refining surface of the at least one outlet element and the sub-surface of the second refining surface of the movable treatment body, which is applied with the mixture of substances.

This can take place independently or even in combination with other measures, such as the setting of the relative speed and/or the process pressure of the mixture of substances and/or the setting of a radial distance in case of a disc-shaped treatment body.

It may be particularly advantageous to regulate the relative speed of the moving treatment body in order to adjust the refining intensity formed in the gap-type treatment zone. It can also be advantageous that the working distance or refining gap between the at least one outlet element and the corresponding sub-surface applied with the mixture of substances is regulated in order to set pre-definable pressure forces on the moving treatment body by means of at least the feeding device. The first refining surface is not in direct contact with the second refining surface. The pressure forces, i.e. a contact pressure, can bring about targeted adjustment of the working distance and thus a defined treatment zone, since a "floating" and possibly the formation of an uncontrolled treatment zone could take place as a result of the local passage of the mixture of substances with the pre-definable process pressure. The outlet speed of the processed mixture of substances can thus be influenced, as a result of which the refining intensity in the gap-type treatment zone can be adjusted in a targeted manner.

Furthermore, provision can be made for at least two outlet elements to be arranged symmetrically in the circumferential direction and/or radial direction relative to the movable treatment body.

Through the arrangement of several outlet elements, which each form a treatment zone together with a common treatment body, the throughput of the mixture of substances can be significantly increased. This is particularly advantageous, since, during ongoing operation, one or several outlet elements can be easily "switched on/off" as necessary and even maintenance work of individual outlet elements is possible. In addition, this measure can be used to reduce or even completely compensate for any bending moments that are applied onto the treatment body through the process pressure and/or the contact pressures. This enables a more stable and low-maintenance device.

Furthermore, it can be provided that at least one second outlet element is arranged essentially opposite to a first outlet element, whereby the first outlet element is assigned to a second refining surface of the movable treatment body and the respective corresponding second outlet element is assigned to a third refining surface opposite to the second refining surface.

Due to the formation of plural outlet elements, which each form a treatment zone together with the common treatment body, the throughput of the mixture of substances can also be significantly increased. Through the opposite arrangement of two corresponding outlet elements, a reduction in the bending moments, up to a complete compensation of the bending moments, on e.g. the drive axis of the treatment body or even the treatment body itself, can be brought about. This measure can be advantageous in case of band-shaped treatment bodies as well as in case of rotationally symmetrical treatment bodies, e.g. a cylinder or a disc, as long as the sub-surfaces of the corresponding outlet elements applied with the mixture of substances essentially lie opposite to the second and third refining surfaces.

It can also be provided that at least two outlet elements are arranged along the direction of movement and/or essentially orthogonally in relation to the direction of movement of the movable treatment body.

It is also conceivable here for the outlet elements to be arranged staggered, i.e. offset with one another, in at least one direction. The arrangement of several outlet elements allows for higher productivity using only one common treatment body. This advantage is similar to the formation of the aforementioned outlet elements arranged opposite one another on second and third refining surfaces mainly in the fact that the power consumption for driving the movable treatment body increases only slightly or even negligibly. Thereby, a large quantity of the mixture of substances can be processed at the same time in a very energy-efficient and cost-effective manner. It can thus easily be imagined that several outlet elements can be arranged along a cylinder or even a cone.

Here, the outlet elements can basically also be arranged opposite one another on the second refining surface, i.e. for example an outer surface of the cylinder; as a result, the bending moments on the drive axis of the treatment body can be compensated for. It is also conceivable to arrange the outlet elements in the circumferential direction of a disc, which causes the same effect on the disc.

An increase in the number of outlet elements can, in any case, bring about a considerable increase in the sub-surfaces, applied with the mixture of substances, on the total surface of the second and/or third refining surface, which, according to the invention, is associated with a comparatively low increase in the idle power.

Furthermore, several outlet elements can also be assigned to a common adjustment device and/or supply device, which results in a very favourable design.

A design, according to which it can be provided that at least the movable treatment body of the drive device is arranged with sealing from a housing, by means of at least one contacting and/or non-contact sealing element, preferably a maintenance-free labyrinth seal, is also advantageous.

Complex sealing solutions can be dispensed with thanks to the relatively simple design of the device according to the invention. Although the mixture of substances is treated with a process pressure, the mixture of substances is, as a rule, only exposed to atmospheric conditions after it exits. In order to collect the processed mixture of substances, a housing is advantageous, which shields at least the sub-surfaces that are applied with the mixture of substances, preferably the entire treatment body, from the environment. In order to seal the housing openings such as the outlet elements or a drive shaft, e.g. simple contacting rubber seals can be used, or even self-sealing, maintenance-free labyrinth seals, as are known to the skilled person. This enables particularly long maintenance intervals and low production costs.

It has proven to be advantageous if a collecting container for collecting and/or further processing the processed mixture of substances is assigned to the housing. In certain cases, an essentially complete sealing of the housing can be advantageous in order to place the treatment space under low pressure or high pressure or also to form a protective gas atmosphere therein, as a result of which the quality of the processed mixture of substances can be influenced in a targeted manner.

According to a further development, a chemical and/or enzymatic and/or mechanical pre-treating of the mixture of substances can be carried out prior to the provision of the mixture of substances.

By means of a chemical and/or enzymatic pre-treating, the drying of the fibre components can be influenced in a targeted manner, as a result of which the treating, especially shredding, of the fibres can be facilitated. Such a pre-treatment can be carried out in an external device or even in a section of the supply device provided for this purpose. Likewise, a mechanical pre-treatment is possible for setting a pre-definable fibre length or distribution of the fibre lengths and/or diameters. Such mechanical pre-treatments, as well as sorting, sifting, etc. are sufficiently known to the skilled person. A suitable pre-treatment can thus be used for increasing the quality of the processed mixture of substances and integrated into the method according to the invention.

Furthermore, it can be expedient if at least the method steps of pressing through and processing are repeated with at least parts of the processed mixture of substances.

The quality and homogeneity of the processed mixture of substances can be increased through repeated treatment of the mixture of substances containing fibres. It is conceivable here to re-feed at least parts, or even the entire quantity, of the processed mixture of substances of a passage to the device. In this case, a circulation system between the collecting container and the supply device can be used very easily to achieve a pre-definable fibre diameter and/or length distribution. In certain cases, it may be advantageous to adjust the liquid component of the processed and re-supplied mixture of substances by e.g. adding water. A particularly fine pulping of the fibre components can be achieved here with relatively low energy and/or pressure expenditure.

The device or method according to the invention can use one or several sensors for detecting, controlling and monitoring at least parts of the device and of the method. Such sensors are known to the skilled person and are therefore not explained in detail.

For a better understanding of the invention, the same will be explained in more detail based on the following figures.

Figure 4A:
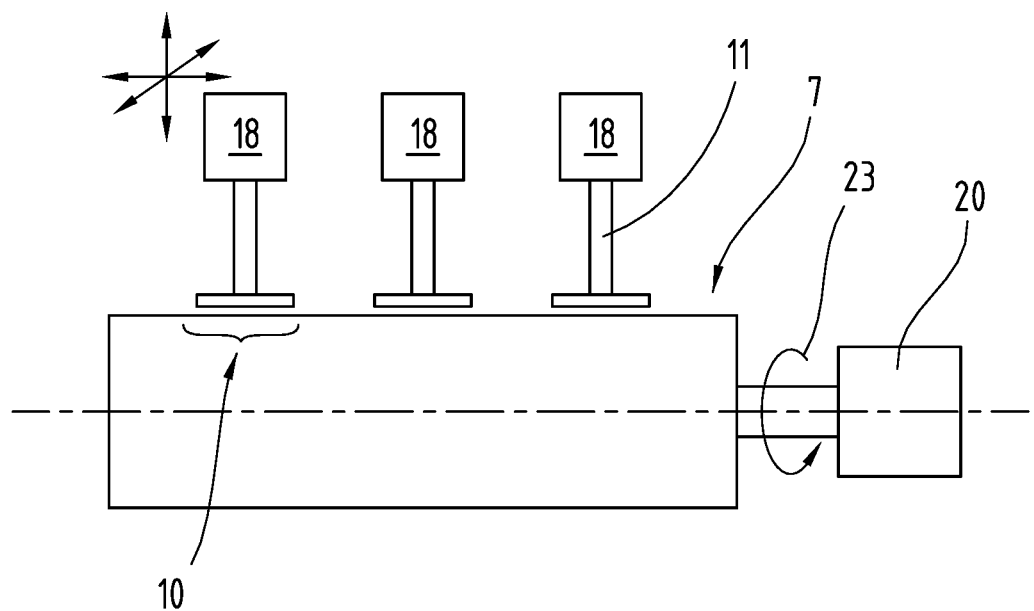
Figure 4B:
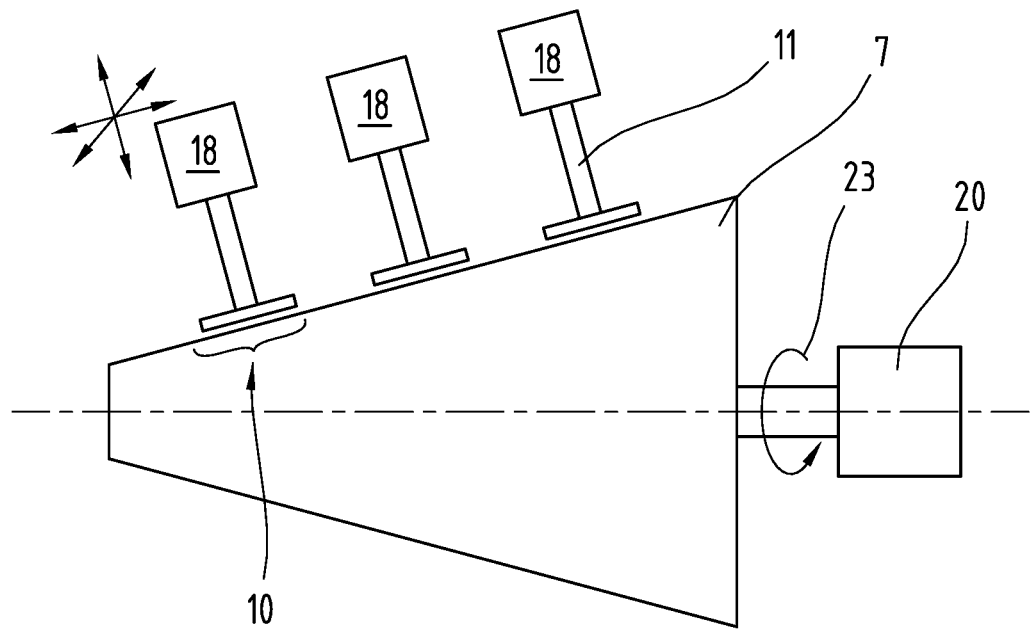
Figure 4C:
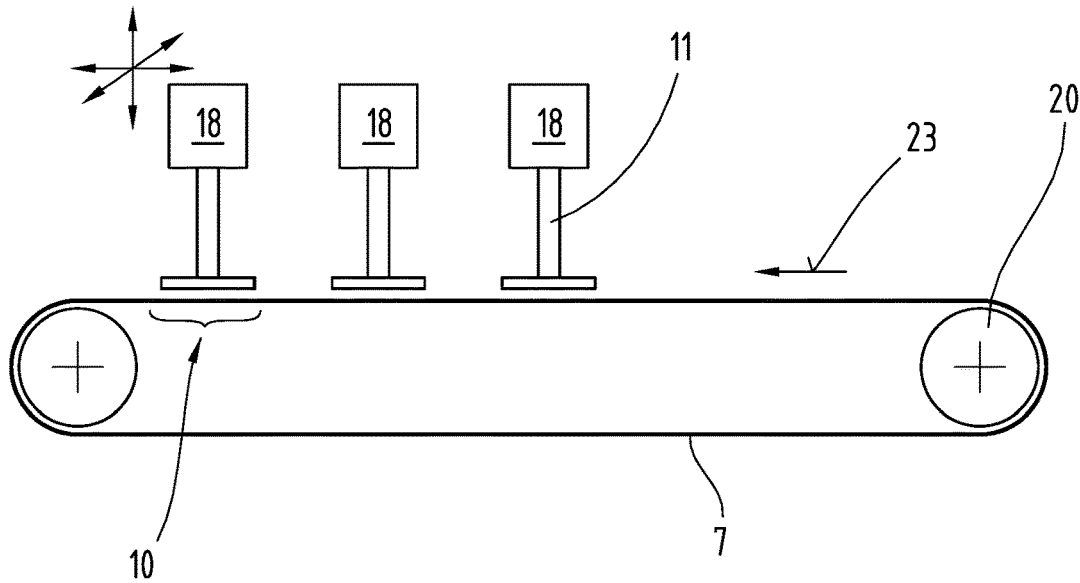
Figure 7:
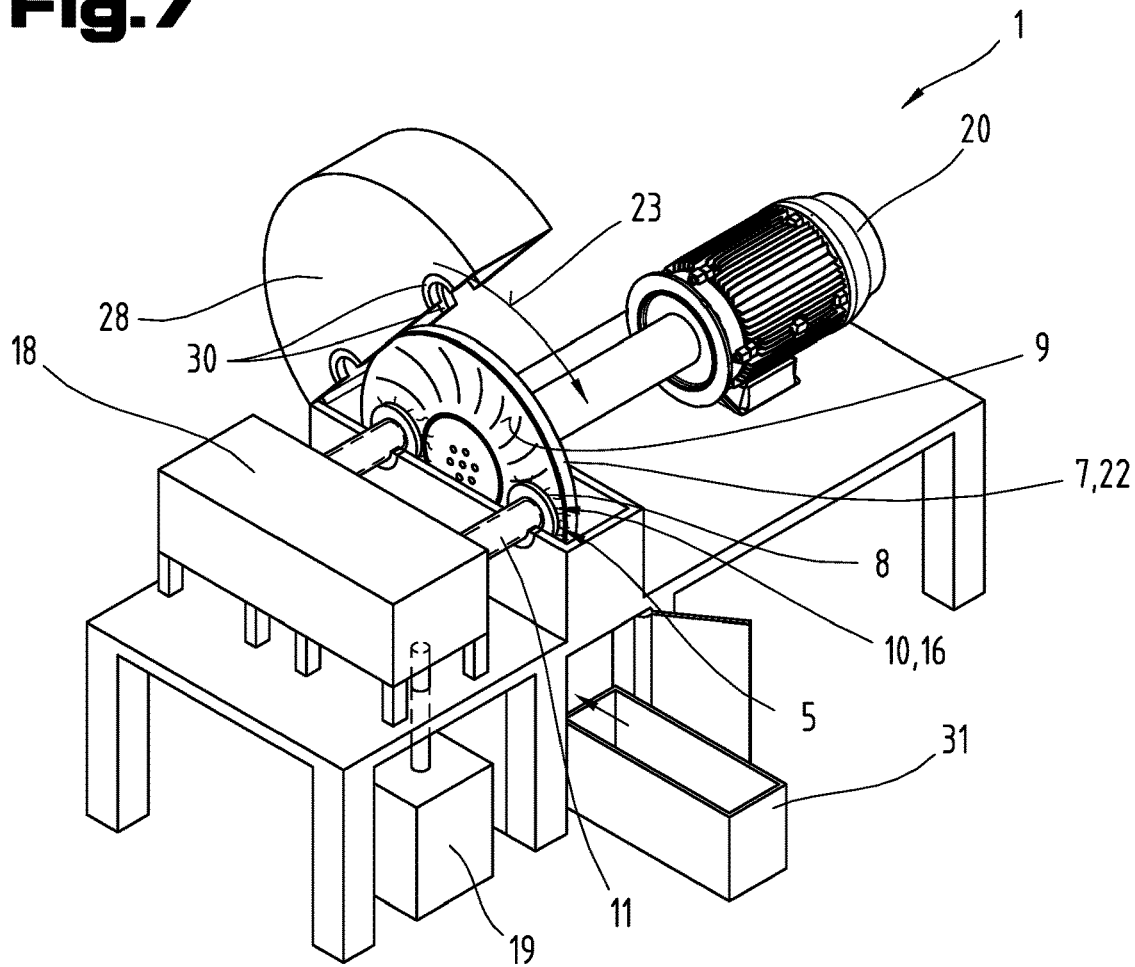
Figure 6:
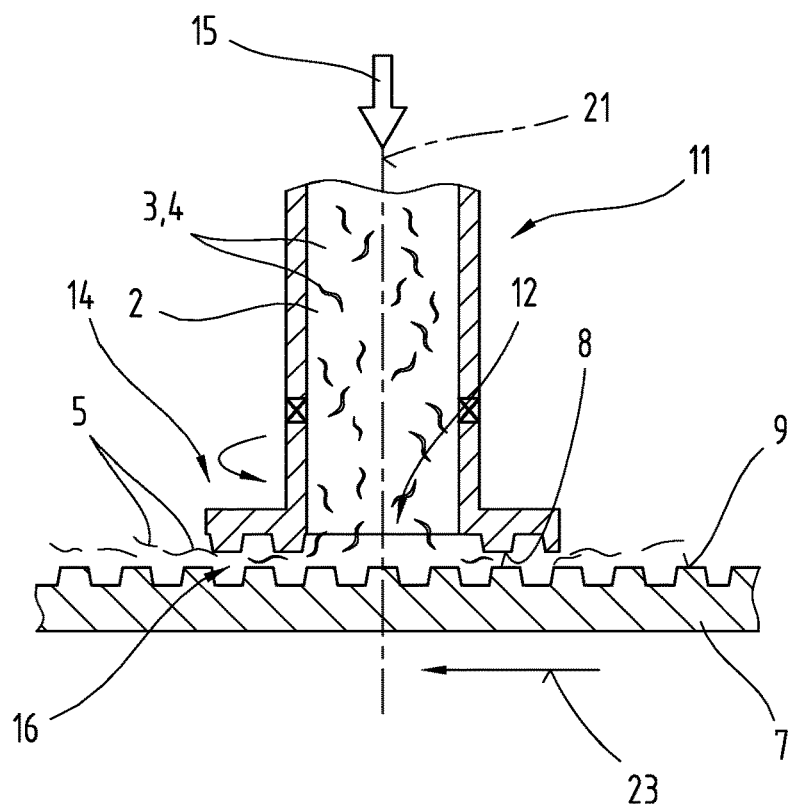

It is shown in each case in a highly simplified, schematic representation:

FIG. 1 a schematic sectional view of a device for the treatment of fibres according to the state of the art (a) and example of an arrangement according to the invention (b);

FIG. 2 a schematic cross-sectional view of an outlet element and a treatment body with respective refining surfaces for explanation of the operating principle;

FIG. 3 a schematic cross-sectional view of possible embodiments of a device with two outlet elements, which are arranged in a distributed manner in the circumferential direction on a second refining surface (a) and are arranged opposite one another on a second and third refining surface (b);

FIG. 4 a schematic cross-sectional view of possible embodiments of treatment bodies as cylinder (a), cone (b) or band (c) with several outlet elements;

FIG. 5 a schematic representation of possible embodiments of outlet elements with a first refining surface with a larger extension in the direction of movement (a), or concentrically arranged rows of blades (b) in a bottom view, or with a first refining surface complementary to the shape (c) in a bottom view;

FIG. 6 a schematic cross-sectional representation of a possible embodiment of an outlet element with a rotatable end section;

FIG. 7 a schematic overview representation of a possible arrangement of a device for treating fibres.

It should be noted introductorily that, in the differently described embodiments, identical parts are provided with identical reference symbols or identical component designations, whereby the disclosures contained in the entire description can be transferred analogously to identical parts with identical reference symbols or identical component designations. Even the position indications selected in the description, e.g. top, bottom, lateral, etc., refer to the figure directly described and illustrated and, in case of a change in position, these position indications should be analogously transferred to the new position.

FIG. 1a is a schematic illustration of a double-disc refiner according to the state of the art. This illustration helps to explain the operating principle of conventional, known treatment devices, in which a very high amount of energy must be applied for moving the rotating refining surfaces or sets. In the selected representation, the mixture of substances 2 is supplied via a substance mixture supply 32 in a pressure housing 33. The movably and rotatably, respectively, arranged rotor 34 forms a treatment zone 16 with the stators 35 on both sides, which extends over the entire rotor surface and the respective stator surfaces. The movement of the mixture of substances 2 used is indicated schematically using movement arrows. The surfaces 36, which are applied with the mixture of substances, are shown by dotted lines for better illustration. As can be seen very clearly from this representation, it is necessary to apply the mixture of substances to the entire moving surface 36 of both refining tools used in the treatment process, i.e. the rotor 34 and the stators 35. Normally, the refining tools used are very expensive and partly complicated. In addition, the shaft of the rotor 34, as well as secondary surfaces that are not effective in the treatment process, such as the lateral or outer surfaces of the rotor and the stators, are fully applied with the mixture of substances 2, i.e. also with the process pressure in the pressure housing 33. This causes a very high power consumption and required idle power, respectively, of the known device. This also applies analogously for surfaces of refiners with a drum or cone arrangement, which are fully applied with the mixture of substances and which are not shown here.

After the treatment or processing of the mixture of substances 2 in a known device, as shown in FIG. 1a, the processed mixture of substances or fibres 5 exits through a mixture of substances outlet opening 37. Up to the mixture of substances outlet opening 37, the mixture of substances 2 or the processed mixture of substances 5 is usually exposed to the process pressure 15, which is why sealing elements 30, which are not shown in detail, but are partly very complex, must be provided for sealing the pressure housing 33.

Figure 1B:
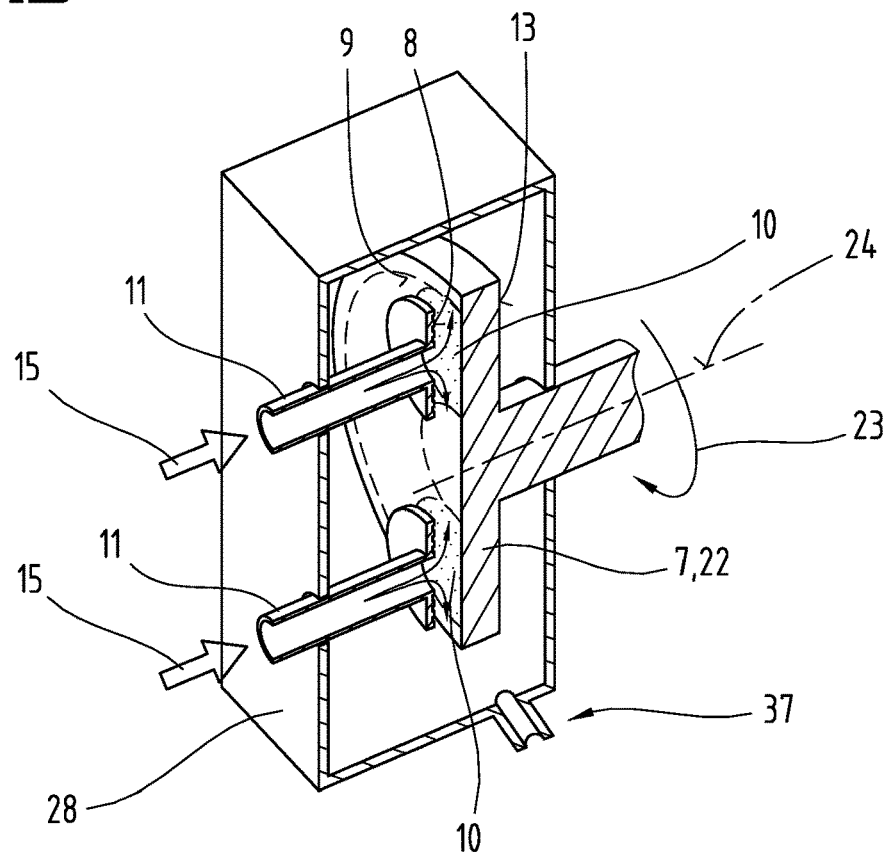

According to the invention, the application of a mixture of substances 2 to a treatment body 7 takes place only on sub-surfaces 10 of a second refining surface 9, which are applied with the mixture of substances, as shown e.g. in FIG. 1b. In size and/or shape, these sub-surfaces 10 of a second refining surface 9, which are applied with the mixture of substances, essentially match with the corresponding first refining surfaces 8. As can be seen in FIG. 1b, for the treatment of the fibres 3 containing mixture of substances 2, a common movable treatment body 7 with a second refining surface 9 is arranged opposite in relation to the at least one outlet element 11. In the selected execution example, two outlet elements 11 are arranged symmetrically spaced-apart in the radial direction from the axis of rotation 24 of the treatment body 7 designed as disc 22. When the mixture of substances 2 containing fibres 3 exits through the two outlet elements 11, a gap-type treatment zone 16 is formed in each case between the first refining surface 8 of the outlet element 11 and the sub-surface 10 of the second refining surface 9 of the movable treatment body 7, which is applied with the mixture of substances.

Through comparison of FIGS. 1a and 1b, the concept according to the invention can be carried out relatively easily, whereby, according to the invention, only small parts of the total surface of the treatment body 7, i.e. only the sub-surfaces 10 of the second refining surface 9, are applied with the mixture of substances. The circular segment surfaces on the second refining surface 9, which are bordered with a dashed line, indicate that part of the processed mixture of substances or of the processed fibres 5 can be "taken along".

However, in comparison with the state of the art, this causes only a negligible proportion of the power consumption of the device 1, since the idle power of the device 1 according to the invention accelerates only a small part of the treated mixture of substances 5 on the second refining surface 9, which is anyway transported away in the direction of the housing 28 due to centrifugal forces.

The at least one outlet element 11 for the passage of the mixture of substances 2 containing fibres has, in each case, one outlet opening 12 and at least one first refining surface 8 arranged around the outlet opening 12 in a circumferential direction. In the selected representation of the operating principle, the representation of possible feeding devices 18, supply devices 19, drive devices 20, etc. in FIG. 1b is dispensed with for the sake of simplicity. Reference is made to the discussion of FIG. 2 to FIG. 7 for the description of the mode of operation and possible arrangements of the said elements.

To illustrate the processes in the treatment of fibres 3 in the treatment zone 16, reference is made to the schematic representation of FIG. 2. The movable treatment body 7 is arranged opposite to the at least one outlet element 11, as a result of which a gap-type treatment zone 16 is formed between the outlet element 11 or the first refining surface 8 and the sub-surface 10 of the second refining surface 9 of the movable treatment body 7, which is applied with the mixture of substances 2.

As shown schematically in FIG. 2, the mixture of substances 2 comprises a liquid component and fibres 3, which can particularly consist of pulp 4 or cellulose. The mixture of substances 2 is pressed through the outlet element 11 with a pre-definable process pressure 15. The movable treatment body 7 can, for example, be "passively" put into a relative movement in a direction of movement 23 through the outlet of the processed mixture of substances or of the treated fibres 5 from the treatment zone 16. The treatment body 7 can also be moved "actively" in the direction of movement 23 by means of a drive device 20, e.g. as shown in FIG. 3 or FIG. 7. When the fibres 3 containing mixture of substances 2 passes through the outlet element 11, the fibres 3 are primarily treated with pressure shocks in the gap-type treatment zone 16 formed in the gap-type manner. These pressure shocks on the fibres 3 are caused through the relative movement of the first and second refining surface 8, 9, especially through the teeth, blades, rows of blades 26 arranged on the respective refining surfaces or similar identically functioning elements.

As can very well be seen from FIG. 2 in connection with FIG. 1, as well as FIG. 4 to FIG. 6, the relative movement of the treatment body 7 is used to avoid clogging of any notches 29 of the first and/or further refining surfaces 8,9,13.

The exemplary embodiment in FIG. 1b illustrates a treatment body 7 designed as disc 22. In this case, the treatment body 7 is rotatable around an axis of rotation 24 or movable. The outlet element 11 has an outlet element axis 21, which essentially corresponds to an imaginary longitudinal axis through the outlet element 11 at the centre of the outlet opening 12. As can be seen especially well from FIG. 2 in connection with FIG. 1b and/or FIG. 3 and FIG. 7, the relative speed 27 in the treatment zone 16 can be set mainly using the radial distance 25 between the outlet element axis 21 and the axis of rotation 24.

It can be seen from the combined view of FIG. 2 and FIG. 1b, FIG. 3 to FIG. 7 that the movable treatment body 7 goes past the outlet element 11 in a movement direction 23. This relative movement takes place preferably and essentially in a lateral way, especially orthogonally towards an outlet element axis 21.

Figure 3A:
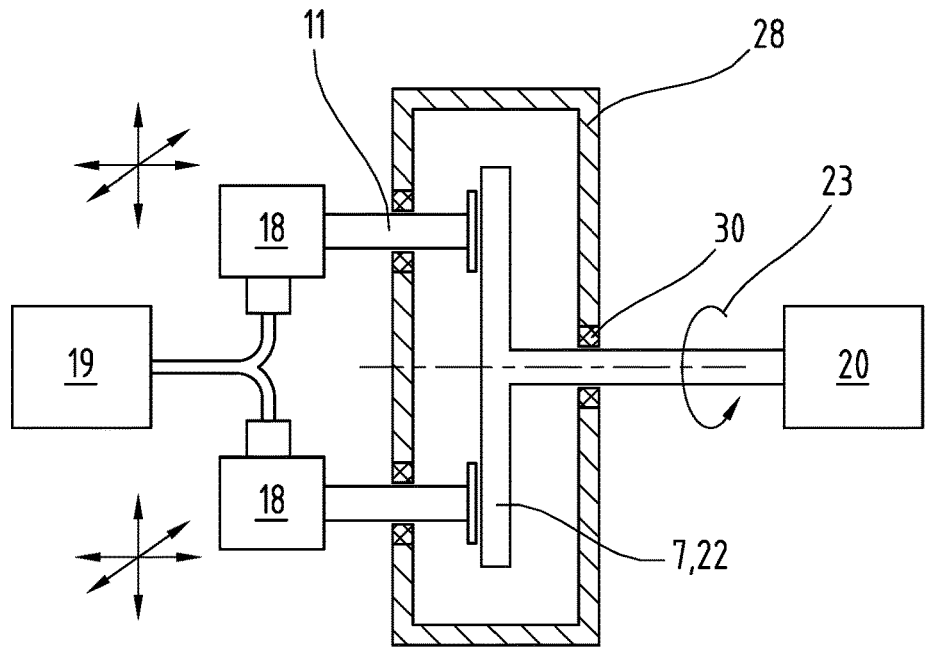

An exemplary design of a feeding device 18 for positioning the outlet element 11 is illustrated in FIGS. 3, 4 and FIG. 7 and can be accordingly transferred onto FIGS. 1b, 2 and 5. As can especially be seen from FIGS. 3a and b, the feeding device 18 can be used to move the at least one outlet element 11 in the direction of the treatment body 7 and/or transversely in relation to it. Such a feeding device 18 can particularly be used to set the working distance 17.

Figure 3B:
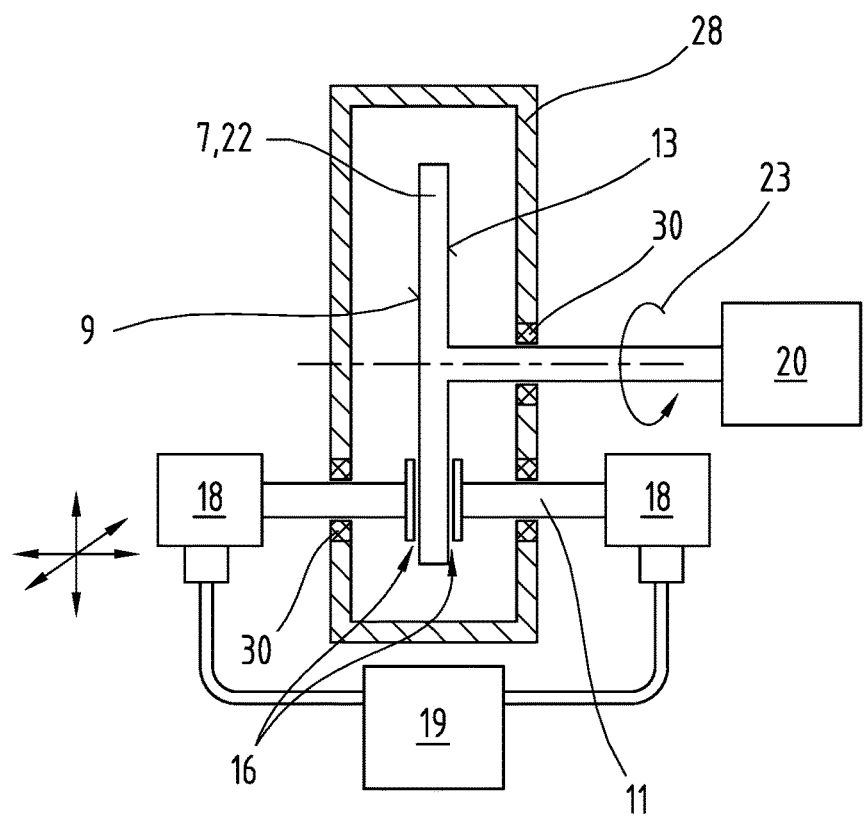

FIGS. 3a to 3c schematically represent devices 1, in which two or more outlet elements 11 are arranged in relation to a treatment body 7. FIG. 3a represents two outlet elements 11, which are arranged on a second refining surface 8 of the treatment body 7 symmetrically spaced-apart from the axis of rotation 24. FIG. 3b schematically represents a situation, where two outlet elements 11 are arranged essentially opposite and symmetrical to each other on a second refining surface 8, or a third refining surface 9, of the treatment body 7. In the embodiments represented in FIGS. 3a and b, any bending moments on the disc 22 and thus on the axis of rotation 24 can be compensated for by designing the treatment body 7 as disc 22.

The supply of the at least one outlet element 11 can, in each case, be achieved via a separate supply device 19 or even via a common supply device 19 for provision of the fibres 3-containing mixture of substances 2. The representation of such supply devices 19 in FIG. 1, FIG. 2, FIG. 4 and FIG. 5 is dispensed with for the sake of simplicity.

The movable treatment body 7 can, according to the invention, be designed as a rotationally symmetrical body, e.g. as a cylinder or a drum or a cone or a disc 22, as represented in FIG. 1b to FIG. 3 and FIG. 4a, 4b or FIG. 7. Alternatively, it is possible to design the movable treatment body 7 as a band, e.g. as a chain or a band, as can be seen schematically from FIG. 4c. It can be seen particularly from FIGS. 3 and 4 that several outlet elements 11 can be assigned to a commonly used treatment body 7. The movable treatment body 7 can be connected with a drive device 20, as can be seen from FIGS. 3, 4 and 7. Such a drive device 20 can be designed e.g. as a hydraulic or pneumatic motor and especially preferably as an electric motor and can have speed control.

The feeding device 18 schematically represented in FIGS. 3, 4 and 7 can be designed such that it can be aligned or positioned for setting a working distance 17 between the at least one outlet element 11 and the sub-surface 10 of the second or third refining surface 9,13 of the movable treatment body 7, which is applied with the mixture of substances 2. By means of such a feeding device 18, possibly the radial distance 25 of an outlet element 11 from the axis of rotation 24 of a treatment body 7 designed as a disc 22 can also be set, as can be seen particularly well in the overview of FIG. 1b, FIG. 2 and FIG. 7. It is also imaginable that several outlet elements 11 can be positioned together in relation to the treatment body 7 by means of a common feeding device 18. It can also be seen from FIGS. 3 and 4 that at least two outlet elements 11 can be arranged in the circumferential direction and/or radial direction and/or longitudinal direction in relation to the movable treatment body 7. The outlet elements 11 can thereby be arranged symmetrically and/or offset with one another on a second refining surface 8 and/or third refining surface 9.

A special embodiment in cylinders, cones, bands or chains has not been illustrated, in which at least a second outlet element 11 is arranged essentially opposite to a first outlet element 11, whereby the first outlet element 11 or the first refining surface 8 of a second refining surface 9 of the movable treatment body 7 and the corresponding second outlet element 11 is arranged on a third refining surface 13 opposite to the second refining surface 9. For a treatment body 7 designed as a disc 22, this situation can be seen from FIG. 3b and can be extrapolated by the skilled person onto other rotationally symmetrical and/or band-shaped treatment body 7.

In FIGS. 5a to c and FIG. 6 several outlet elements 11 in different possible embodiments are shown.

Figure 5A:
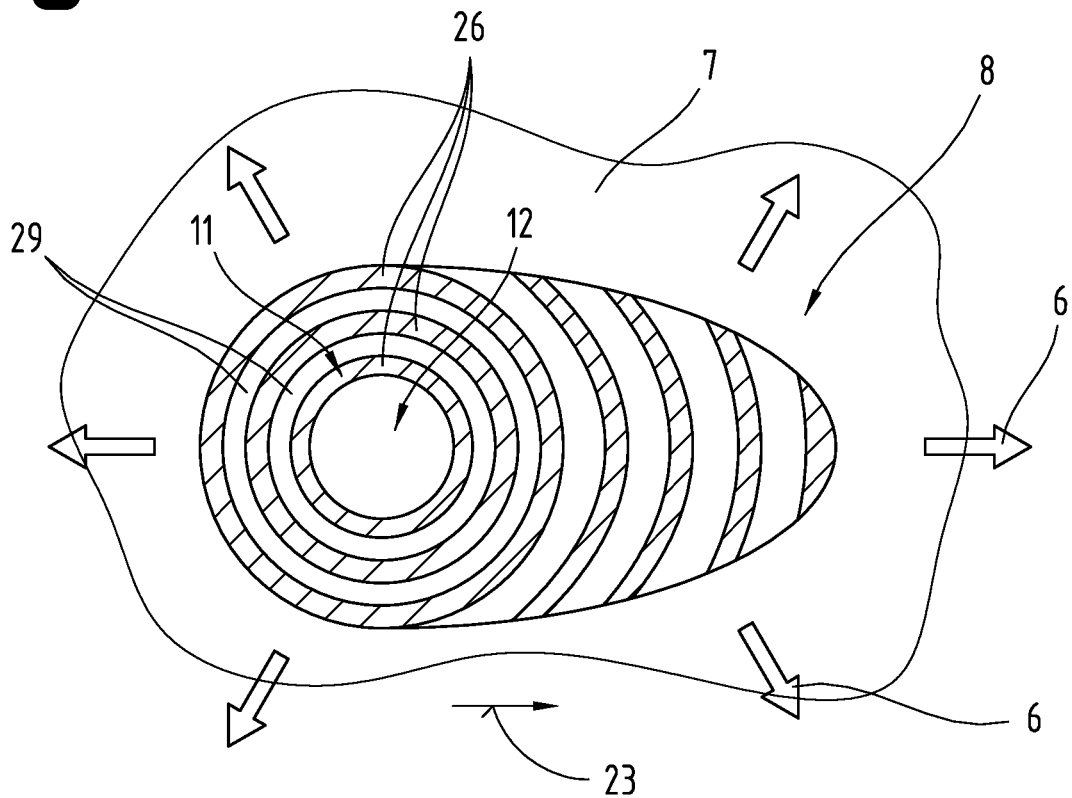

FIG. 5a schematically shows a bottom view of an outlet element 11 with a first refining surface 8, which has a larger longitudinal extension in the direction of movement 23 than in the diagonal and/or transverse direction. The arrangement of blades, spikes or other extensions on the first refining surface 8 can be selected by the skilled person depending on the desired application, e.g. as disperser or refiner. Similarly, this is also applicable for the second and/or third refining surface 9,13, which are not represented separately. The represented exemplary execution shows several rows of blades 26 surrounding the outlet opening 12 and distributed outwards, which are spaced apart from one another using notches 29. When such first refining surfaces 8 are used, their shape can be optimised by the skilled person according to the respective application and geometry of the treatment body 7. The treatment zone 16 should, as explained above, be formed essentially between the first refining surface 8 and the corresponding sub-surface 10 of the second refining surface 9, which is applied with the mixture of substances.

Figure 5B:
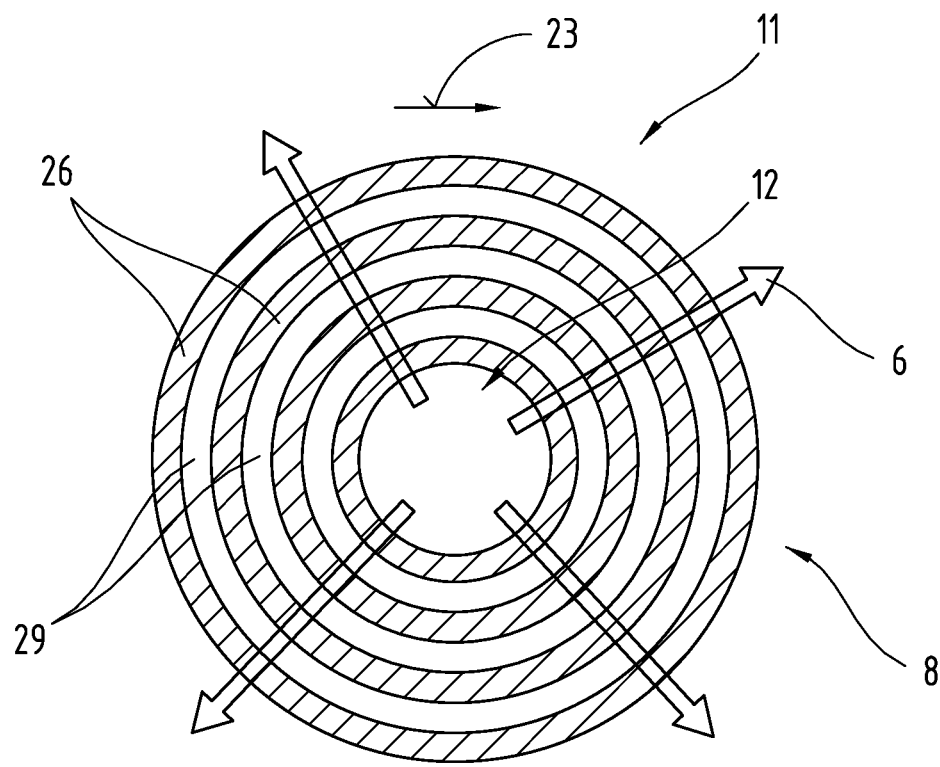

FIG. 5b shows a similar embodiment of an outlet element 11 with a first refining surface 8 in the bottom view, where the rows of blades 26 each have continuous and thus closed refining edge. A concentric arrangement of the rows of blades 26, spaced apart from each other using notches 29, can also be seen in the selected representation.

As can very well be seen from FIGS. 5a and 5b, homogenisation of the mixture of substances outlet 6 along the circumference of the first refining surface 8 can be achieved through the suitable design of the first refining surface 8, especially through its geometry and/or arrangement of blades. The outlet 6 of the mixture of substances is indicated with motion arrows.

Figure 5C:
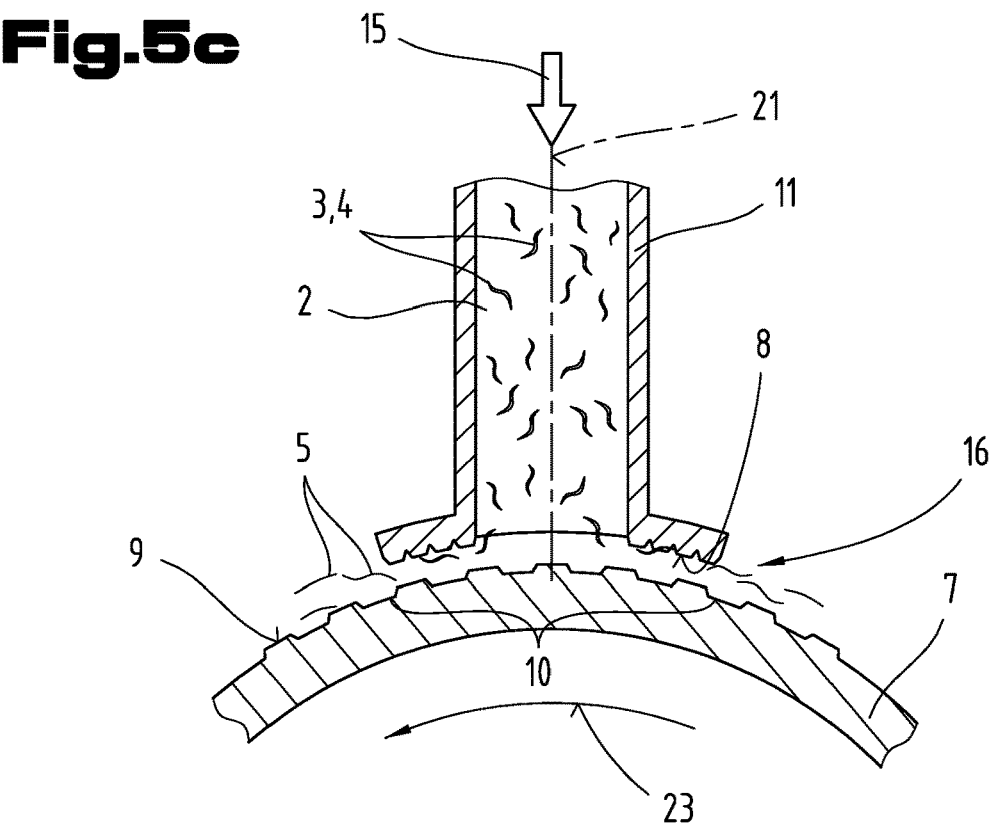

FIG. 5c shows a schematic sectional view through an outlet element 11, a first refining surface 8 surrounding the outlet opening 12 as well as a curved treatment body 7. The first refining surface 8 is designed as being essentially complementary in shape to the sub-surface 10 of the treatment body 7 or of the second refining surface 9, which is applied with the mixture of substances 2. Here, especially concave and convex shapes of the first refining surface 8 can be imagined, as can be seen particularly well in FIG. 5c.

FIG. 6 shows a schematic sectional view of another possible embodiment of an outlet element 11, whereby the outlet element 11 has a rotatable end section 14. This end section 14 can be designed as being easily replaceable for easier maintenance. Likewise, such an end section 14 can be "passively" or "actively" rotatable, whereby the "active" rotation can be carried out by means of a rotation device that is not shown. It is easily comprehensible from FIG. 6 that any wear of the first refining surface 8, especially in the direction of movement 23, can be homogenised through the incremental and/or continuous rotation of the end section 14 over the circumference of the first refining surface 8.

According to the invention, the outlet elements 11 shown in FIGS. 5a to 5c and FIG. 6 as well as their discussions can be included in the description of FIGS. 1b, 2, 3, 4 and 7. Likewise, their combination within the scope of this invention has not been discussed separately for the sake of brevity, but reference is made to the corresponding discussions.

FIG. 7 shows a schematic overview of the device 1 according to the invention. Here, two outlet elements 11 are arranged in relation to the movable treatment body 7.

Positioning of the respective outlet element 11 is performed by means of a feeding device 18. The supply of the mixture of substances 2 takes place via a supply device 19. The treatment body 7 designed as a disc 22 is driven by a drive device 20 in a direction of movement 23.

As can be seen from FIG. 7, the device 1 has a housing 28, which is shown in an opened state. The housing 28 primarily serves for collecting the substances during the treatment and can be sealed at least against the drive device 20 using one or several sealing elements 30. Such sealing elements 30 are, for example, also shown in FIG. 3 and can be designed as contacting or even non-contact sealing elements. The processed mixture of substances or the processed fibres 5 can be collected in a collecting container 31. It is also conceivable that the supply device 19 is connected with the collecting container 31 in order to implement a circulation principle.

Within the scope of this invention, the individual method steps can also be automated and preferably controlled via a central, not shown system control. Moreover, the operation is contemplated on an operating panel or even a touch screen for the monitoring and control of the device 1.

The setting of a pre-definable distribution of fibre lengths and/or fibre cross-sections and/or their distribution can thus be defined by the user and regulated using a system control. The repeated passage of at least parts of the process mixture of substances 5 can also be used to set the homogeneity and/or quality of the processed fibres 5.

The substance density of the mixture of substances 2 can influence the quality of the processed mixture of substances 5. Suspensions, i.e. mixtures of substances 2, with a fibre proportion of 0.1 to approx. 35 vol. %, preferably 1 to approx. 20 vol. %, can be processed safely and easily with this device 1 and the corresponding method. Substance densities of up to 50 vol. % and above are also imaginable. Under certain circumstances, it may be necessary for the skilled person to fall back on suitable supply devices 19, which are able to forward mixtures of substances 2 with such high substance densities. For example, feed screw arrangements are particularly suited for this.

The embodiments show possible embodied variants, whereby it should be noted at this point that the invention is not limited to the specifically represented execution variants of the same, but various combinations of the individual embodied variants among themselves are also possible and this variation possibility lies in the ability of the skilled person working in this technical field based on the technical teaching of this invention.

The scope of protection is determined by the claims. The description and the drawings should however be used for interpreting the claims. Individual features or combinations of features from the different represented and described execution examples can, in their own right, represent independent inventive solutions. The task underlying the independent inventive solutions can be found in the description.

All specifications about value ranges in this description should be understood such that these include any and all sub-ranges thereof, e.g. the specification 1 to 10 should be understood such that all sub-ranges, starting from the lower limit 1 and the upper limit 10 are included, i.e. all sub-ranges start with a lower limit of 1 or larger and end with an upper limit of 10 or lower, e.g. 1 to 1.7, or 3.2 to 8.1, or 5.5 to 10.

For the sake of good order, it is finally pointed out that elements have partly been represented not to scale and/or in a scaled-up and/or a scaled-down form for a better understanding of the structure.

LIST OF REFERENCE SIGNS

1 Device
2 Mixture of substances
3 Fibre
4 Cellulose
5 Processed mixture of substances/fibres
6 Mixture of substances outlet
7 Treatment body
8 First refining surface
9 Second refining surface
10 Sub-surface applied with mixture of substances
11 Outlet element
12 Outlet opening
13 Third refining surface
14 End section
15 Process pressure
16 Treatment zone
17 Working distance
18 Feeding device
19 Supply device
20 Drive device
21 Outlet element axis
22 Disc
23 Direction of movement
24 Axis of rotation
25 Radial distance
26 Row of blades
27 Relative speed
28 Housing
29 Notch
30 Sealing element
31 Collecting container
32 Substance mixture supply
33 Pressure housing
34 Rotor
35 Stator
36 Surface/secondary surface applied with the mixture of substances according to the state of the art
37 Mixture of substances outlet opening

The invention claimed is:

1. A device for treating fibres of a mixture of substances containing fibres, the device comprising:
   at least one outlet element for the passage of the mixture of substances containing fibres with an outlet opening and at least one first refining surface arranged around the outlet opening in a circumferential direction,
   at least one feeding device for positioning the outlet element; and
   for treating the mixture of substances containing fibres, a movable treatment body comprising a second refining surface is arranged opposite relative to the at least one outlet element, wherein, during the passage of the mixture of substances containing fibres through the outlet element, a gap-type treatment zone is formed between the first refining surface of the outlet element and a sub-surface of the second refining surface of the movable treatment body, which is applied with the mixture of substances;
   wherein at least the first refining surface has at least one blade;
   wherein the at least one blade of the first refining surface has a refining edge that is continuous around the outlet opening of the at least one outlet element.

2. The device according to claim 1, wherein the movable treatment body is capable of being driven in a direction of movement towards an outlet element axis of the outlet element by means of a drive device.

3. The device according to claim 1, wherein the movable treatment body is rotationally symmetrical.

4. The device according to claim 3, wherein the rotationally symmetrical movable treatment body is a disc, a cylinder, a cone, or band shaped.

5. The device according to claim 1, wherein the movable treatment body is a disc that is rotatable laterally towards the outlet element.

6. The device according to claim 5, wherein the at least one feeding device is movable parallel to an axis of rotation of the disc, in order to set a pre-definable radial distance of the outlet element axis from the axis of rotation.

7. The device according to claim 1, wherein the first refining surface has a larger longitudinal extension in the direction of movement than in a transverse direction and/or against the direction of movement.

8. The device according to claim 1, wherein the at least one blade of the first refining surface is arranged concentrically to the outlet opening.

9. The device according to claim 1, wherein the first refining surface is substantially complementary in shape to the sub-surface of the second refining surface of the movable treatment body, which is applied with the mixture of substances.

10. The device according to claim 1, wherein an end section of the at least one outlet element is at least partly rotatable around the outlet element axis.

11. The device according to claim 1, wherein the at least one feeding device is capable of being aligned in order to set a working distance between the first refining surface of the at least one outlet element and the sub-surface of the second refining surface of the movable treatment body, which is applied with the mixture of substances.

12. The device according to claim 1, wherein at least two outlet elements are arranged symmetrically in the circumferential direction and/or radial direction in relation to the movable treatment body.

13. The device according to claim 1, wherein the at least one outlet element is a first outlet element, the device further comprises at least one second outlet element that is arranged substantially opposite to the first outlet element, and the second outlet element is assigned to a third refining surface of the moveable treatment body that is opposite to the second refining surface.

14. The device according to claim 1, wherein at least two outlet elements are arranged along the direction of movement and/or orthogonally to the direction of movement.

15. The device according to claim 1, wherein at least the movable treatment body of the drive device is arranged in a sealed manner from a housing by means of a contacting and/or non-contacting sealing element.

16. The device according to claim 1, wherein the refining edge of the at least one blade of the first refining surface is continuous along a complete circumference of the at least one first refining surface.

17. The device according to claim 1, wherein the movable treatment body is band shaped.

18. A method for treating fibres of a mixture of substances containing fibres, the method comprising:
   providing the device according to claim 1;
   providing the mixture of substances, which comprises at least one liquid component and fibres;
   moving the movable treatment body relative to the at least one outlet element at a relative speed;

pressing the mixture of substances through the at least one outlet element with a process pressure;

treating the mixture of substances by forming the gap-type treatment zone for the treatment of fibres between the first refining surface of the at least one outlet element and the sub-surface of the second refining surface of the movable treatment body, which is applied with the mixture of substances by the outlet element, wherein the outlet element is positioned relative to the movable treatment body.

19. The method according to claim 18, wherein the movable treatment body is moved in a direction of movement towards an outlet element axis of the outlet element by means of a drive device.

20. The method according to claim 18, wherein the relative speed of the moving treatment body is regulated in order to set a refining intensity formed in the gap-type treatment zone.

21. The method according to claim 18, wherein a working distance is regulated between the first refining surface of the at least one outlet element and the corresponding sub-surface of the second refining surface, which is applied with the mixture of substances, in order to set pressure forces on the moving treatment body by means of at least one feeding device.

22. The method according to claim 18, wherein a chemical and/or enzymatic and/or mechanical pre-treatment of the mixture of substances is carried out prior to the provision of the mixture of substances.

23. The method according to claim 18, wherein at least the pressing-through and the treating are repeated with at least parts of the processed mixture of substances.

24. The method according to claim 18, wherein during the pressing-through an end section of the outlet element is rotated around the outlet element axis.

* * * * *